United States Patent
Banerjee et al.

(10) Patent No.: US 10,972,282 B2
(45) Date of Patent: *Apr. 6, 2021

(54) DISTRIBUTED LOGGING OF APPLICATION EVENTS IN A BLOCKCHAIN

(71) Applicant: International Business Machines Corporation, Armonk, NY (US)

(72) Inventors: Pradipta K. Banerjee, Bangalore (IN); Pooja Kulkarni, Bangalore (IN); Harshal S. Patil, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 165 days.

This patent is subject to a terminal disclaimer.

(21) Appl. No.: 16/388,413

(22) Filed: Apr. 18, 2019

(65) Prior Publication Data

US 2019/0245694 A1 Aug. 8, 2019

Related U.S. Application Data

(63) Continuation of application No. 15/478,862, filed on Apr. 4, 2017, now Pat. No. 10,320,566.

(51) Int. Cl.
*H04L 9/32* (2006.01)
*H04L 29/06* (2006.01)

(52) U.S. Cl.
CPC .............. *H04L 9/3239* (2013.01); *H04L 9/32* (2013.01); *H04L 9/3263* (2013.01); *H04L 2209/38* (2013.01)

(58) Field of Classification Search
CPC ..... H04L 9/32; H04L 9/3239; H04L 2209/38; H04L 2209/56; H04L 9/3236; G06F 11/3676; G06F 11/3688
See application file for complete search history.

(56) References Cited

U.S. PATENT DOCUMENTS

| | | | |
|---|---|---|---|
| 10,826,685 B1 * | 11/2020 | Campagna | H04L 67/1097 |
| 2016/0283939 A1 * | 9/2016 | Finlow-Bates | G06F 21/64 |
| 2017/0046698 A1 * | 2/2017 | Haldenby | G06Q 20/401 |
| 2017/0270527 A1 * | 9/2017 | Rampton | G06Q 20/3223 |
| 2017/0278186 A1 * | 9/2017 | Creighton, IV | G06Q 20/401 |
| 2017/0331810 A1 * | 11/2017 | Kurian | H04L 9/3213 |
| 2018/0157700 A1 * | 6/2018 | Roberts | G06F 16/2365 |
| 2018/0174094 A1 * | 6/2018 | Ren | G06Q 10/087 |

OTHER PUBLICATIONS

P. Snow et al.; Business processes secured by immutable audit trails on the Blockchain; https://www.factom.com/devs/docs/guide/factom-white-paper, Apr. 25, 2018.

(Continued)

*Primary Examiner* — Gary S Gracia

(57) ABSTRACT

A blockchain of transactions may be used for various purposes and may be later accessed by interested parties for ledger verification. One example method of operation may include one or more of monitoring one or more applications to identify application events, identifying one or more application events, determining a hash of a log message payload associated with the application events and logging the hash of the log message payload in a blockchain.

20 Claims, 8 Drawing Sheets

600

(56) References Cited

OTHER PUBLICATIONS

Sparkl-Leverage Block chain for Assurance, sparkl.com/build/assets/resources/Blockchain.pdf; sparkl.com, 2016.
List of IBM Patents or Patent Applications Treated as Related, todays date.
Pradipta K. Banerjee et al., "Distributed Logging of Application Events in a Blockchain", U.S. Appl. No. 15/478,862, filed Apr. 4, 2017.

* cited by examiner

200

```
┌─────────────────────────────────┐
│ INITIATE LOGGING BY APPLICATION │
│        DLOGGING.LOG()           │
│              212                │
└─────────────────────────────────┘
                │
                ▼
┌─────────────────────────────────┐
│  CALCULATE SHA256 HASH OF THE   │
│  PAYLOAD AS ASCII LOG MESSAGE   │
│           OR BINARY             │
│              214                │
└─────────────────────────────────┘
                │
                ▼
┌─────────────────────────────────┐
│     UPLOAD THE PAYLOAD TO A     │
│    REMOTE STORAGE (CLOUD)       │
│              216                │
└─────────────────────────────────┘
                │
                ▼
┌─────────────────────────────────┐
│   REGISTER THE PAYLOAD HASH     │
│  ALONG WITH THE UNIQUE NODE ID  │
│  WHERE THE LOG ORIGINATED IN    │
│      DLOGGING BLOCKCHAIN        │
│              218                │
└─────────────────────────────────┘
                │
                ▼
┌─────────────────────────────────┐
│    USING BLOCKCHAIN SMART       │
│      CONTRACT CAPABILITY        │
│  CALCULATE A LEADERBOARD AND    │
│   STORE IN DATA STRUCTURE       │
│              222                │
└─────────────────────────────────┘
                │
                ▼
┌─────────────────────────────────┐
│  CALCULATE THE SHA256 HASH OF   │
│       LEADERBOARD DATA          │
│              224                │
└─────────────────────────────────┘
                │
                ▼
┌─────────────────────────────────┐      ┌──────────────────┐
│    UPDATE THE HASH OF THE       │      │   RETURN THE     │
│  LEADERBOARD IN BLOCK WORLD     │      │    CALL TO       │
│  STATE ALONG WITH HASH OF LOG   │─────▶│ DLOGGING.LOG()   │
│           PAYLOAD               │      │       228        │
│              226                │      │                  │
└─────────────────────────────────┘      └──────────────────┘
```

DISTRIBUTED LOGGING OF APPLICATION EVENTS IN A BLOCKCHAIN

TECHNICAL FIELD

This application generally relates to logging events, and more particularly, to logging application events in a blockchain.

BACKGROUND

Logging data, such as events which occur on computing devices, offers a way for applications to record critical events during execution. Some of the events could be so critical that they might be useful for auditing or for further verification. Whatever the reason for logging events, the logs which store those events should not be tampered with before they are analyzed.

SUMMARY

One example embodiment may include a method that includes one or more of monitoring one or more applications to identify application events, identifying one or more application events, determining a hash of a log message payload associated with the one or more application events, and logging the hash of the log message payload in a blockchain.

Another example embodiment may include an apparatus including one or more of a processor configured to monitor one or more applications to identify application events, identify one or more application events, determine a hash of a log message payload associated with the one or more application events, and log the hash of the log message payload in a blockchain.

Yet another example embodiment may include a non-transitory computer readable storage medium configured to store instructions that when executed cause a processor to perform one or more of monitoring one or more applications to identify application events, identifying one or more application events, determining a hash of a log message payload associated with the one or more application events, and logging the hash of the log message payload in a blockchain.

BRIEF DESCRIPTION OF THE DRAWINGS

FIG. 2 illustrates a more detailed example of identifying an event and logging the event in a blockchain according to example embodiments.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message.

The instant application relates to identifying events of interest, such as critical events and logging those events in the blockchain for reference purposes. Immutable logs may be used to preserve critical event integrity for those seeking access to the logged data.

According to example embodiments, using a blockchain for auditable, distributed and permissioned logging may provide an optimal approach to logging critical application events and accessing such information at a later time. In addition, a leaderboard procedure can be performed by enabling a smart contract and storing the smart contract for future queries. The hash of the data structures can be archived to provide a simple lookup of logs and the leaderboard. The log data may be hashed and stored in the blockchain, the device identifier associated with the log data may be hashed and stored in the blockchain, and the leaderboard data may also be hashed and stored in the blockchain. The original data may be stored in the cloud, however, the hash data may be included in the blockchain for the above data.

Figure 1:
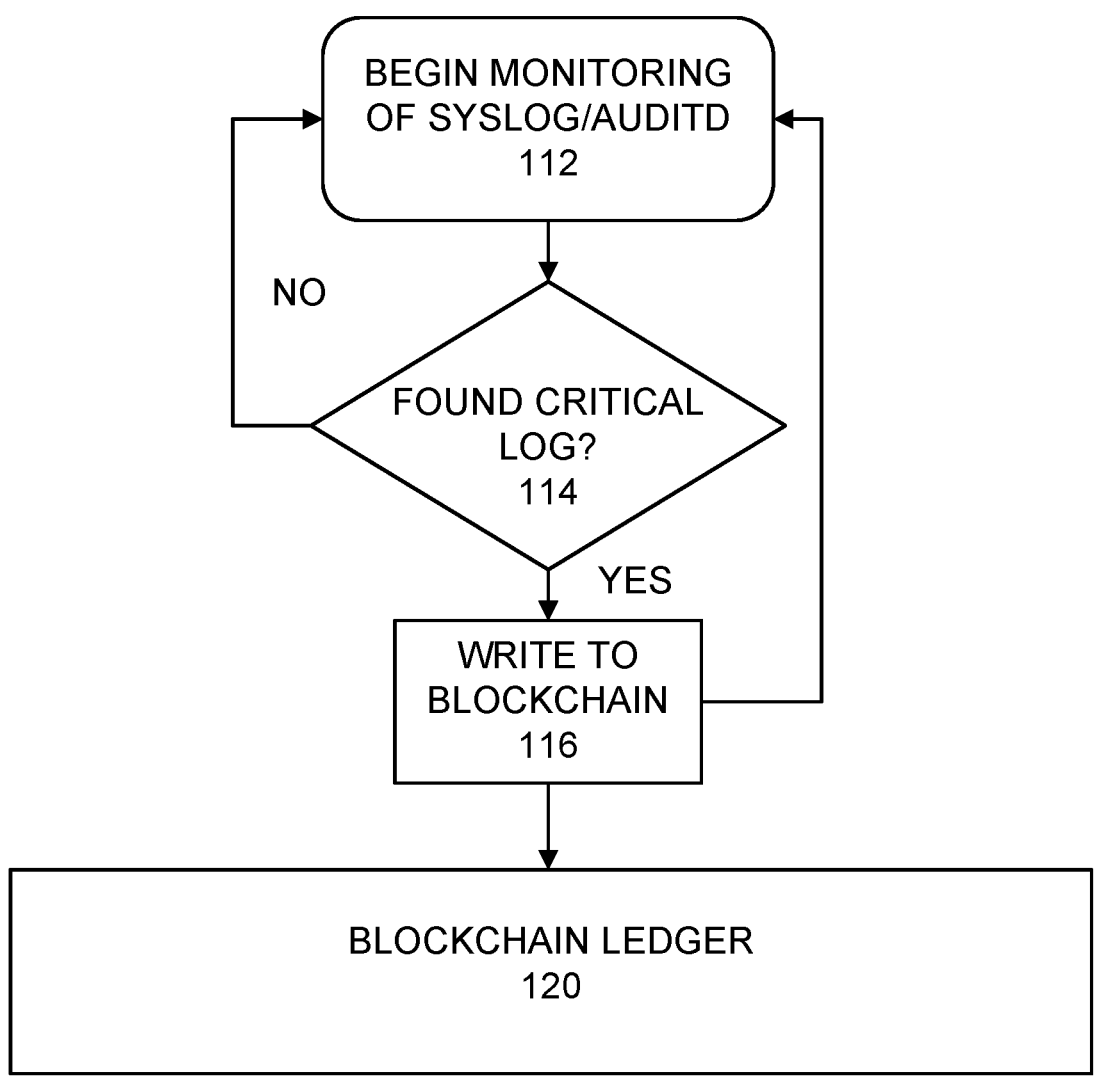
FIG. 1 illustrates an example of identifying an event and logging the event in a blockchain according to example embodiments.

FIG. 1 illustrates an example of identifying an event and logging the event in a blockchain according to example embodiments. Referring to FIG. 1, the flow diagram 100 includes a monitoring operation 112 which is initiated to monitor one or more applications. The application(s) being monitored may produce a log as one log for many applications or one log per application. The log file may include various events. The events can be categorized as critical depending on the nature of the audit being performed on the log. The events which are of interest to a third party may be extracted as critical events. If an event is identified as critical 114 it may be written 116 to the blockchain 120. An example of a critical event would be an application listening on a particular system call or monitoring a crucial system file and generating an alarm if that file is modified.

The blockchain offers a way to log critical information in a trustless manner. As a result, even with root credentials, the storage location of the logs is immutable due to the nature of blockchain transactions (, a Merkle tree configuration). Additionally, the 'smart contract' feature of the blockchain permits the execution of an arbitrary code when transactions are submitted to the chain. Using 'smart contracts' a 'leaderboard' could be maintained, which could provide, at any given point in time, a list of applications sorted by the number of events in blockchains across various time frames. Since this leaderboard is also stored inside the blockchain, it also may utilize the trustless blockchain model. An existing auditing system (such as the 'syslog/auditd' framework) can be extended to log critical events into the blockchain. An application can directly use a procedure to log critical events into the blockchain.

The 'auditd' is the LINUX auditing system, which provides a way to track security-relevant information (it should be noted that any auditing system can be used). Based on pre-configured rules, log entries are generated to record as much information about the events that are happening on a system. Such information can be crucial for mission-critical environments, for example, to determine a violator of a security policy and the actions performed. Just like 'syslog', 'auditd' provides a trail of information about ongoing activities on the system. But 'syslog' is used by applications to voluntarily log events, and 'auditd' is configured by administrator to monitor and log activities/events on the system.

In an operating system, such as LINUX, the term 'syslog' is used to define a log file where the 'system' keeps the log. Any application can write into 'syslog', or use their own logs file and not use 'syslog' at all. Typically, 'syslog' is used by the application to record events that are either very critical or system related, such as an application that was trying to access a database but is having an I/O error when reading the disk. To monitor the 'syslog', every new entry in syslog is being identified. This is similar to monitoring or watching a text file for any new content appended.

FIG. 2 illustrates a more detailed example 200 of identifying an event and logging the event in a blockchain according to example embodiments. Referring to FIG. 2, the logging of an application via the dlogging.log( ) tool may be initiated 212. The hash (i.e., SHA256) of the payload may be determined as an ASCII log message or a binary 214 depending on the preferences of the user attempting to log such data. The payload may be uploaded to the remote storage 216. The payload hash is calculated and paired with the unique node ID of the machine which output the log data 218. A smart contract may be created 222 to represent a leaderboard which is stored in a data structure. The hash of the leaderboard data 224 may also be calculated and stored in the blockchain 226. The procedure may then include a return to call 228 operation to repeat the cycle. Apart from monitoring 'auditd' and 'syslog' an application, 'dlogging' or 'dlogginglog( )' is an interface application that can log events to the blockchain and all the processing is performed by the application 'dlogging'.

Figure 3:
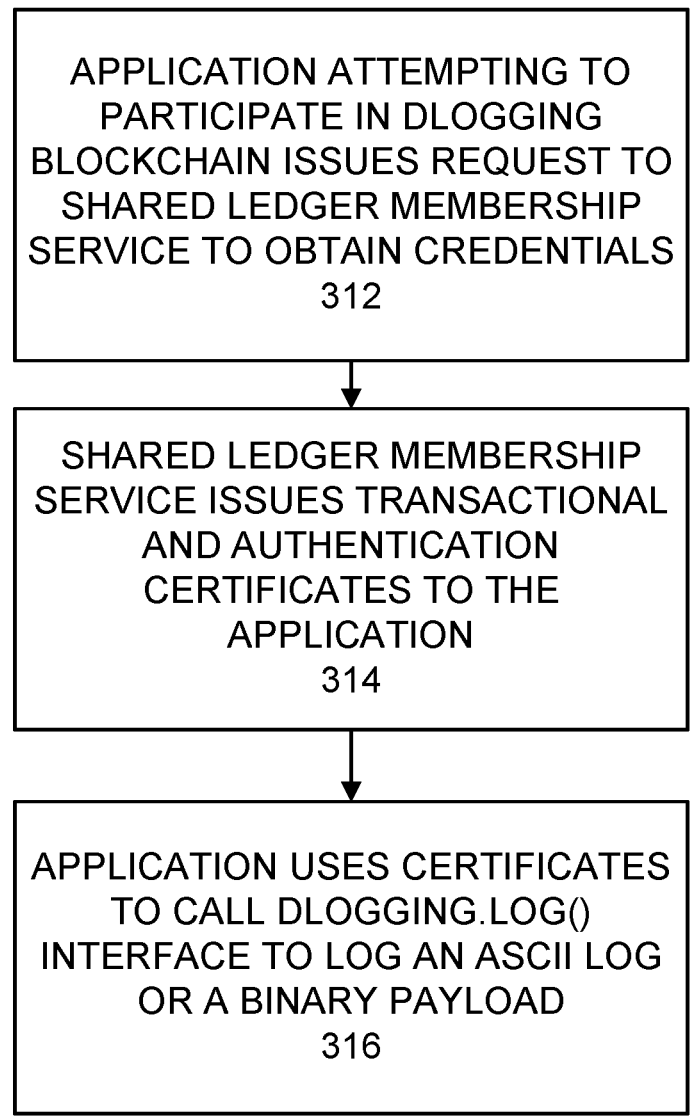
FIG. 3 illustrates an example of authorizing an application to log events and update a blockchain according to example embodiments.

FIG. 3 illustrates an example 300 of authorizing an application to log events and update a blockchain according to example embodiments. In order for an application to obtain access to write to the blockchain, the application may perform a request to participate in the dlogging blockchain by requesting the proper credentials 312. The method may include membership service issuing transactional and/or authorization certificates to the application requesting access 314. The application may then use those certificates to call dlogging.log( ), add updates and store the data hash on the blockchain 316. The configuration may operate on any permissioned ledger. A user of a permissioned ledger must receive authorization from an authorization entity on that particular blockchain. This configuration assists with tracking the transactions on the blockchain to an individual entity.

Figure 4:
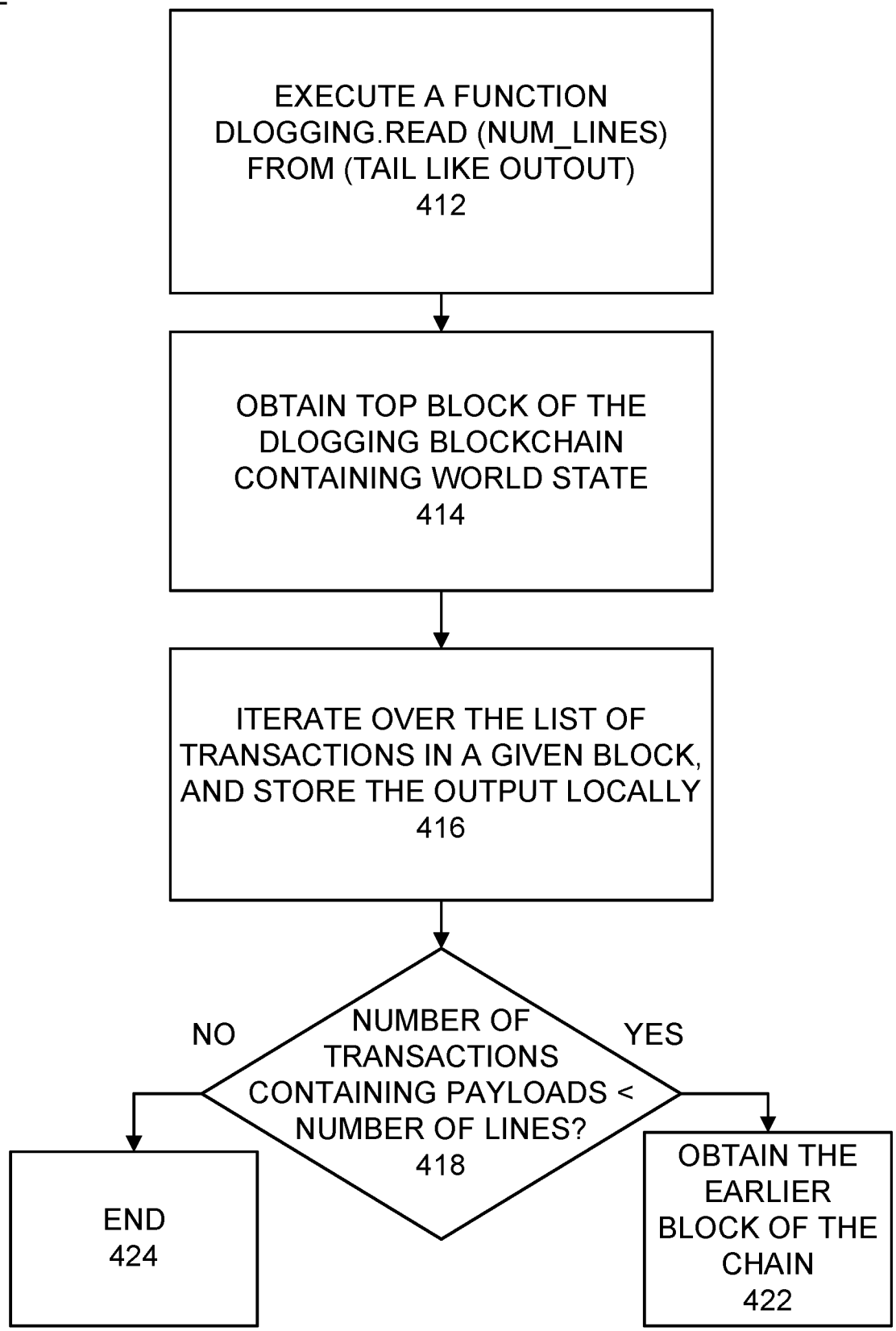
FIG. 4 illustrates an example of retrieving logged data from a blockchain according to example embodiments.

FIG. 4 illustrates an example of retrieving logged data from a blockchain according to example embodiments. Referring to FIG. 4, the example 400 includes executing a function dlogging.read to identify logged data 412 and obtains a top block of the dlogging blockchain which includes the world state 414. The method may also include iterating over the list of transactions in a given block and storing the output 416 locally for easy access in an audit process. The determination may be made as to whether the number of transactions which have payloads are less than the number of lines 418. If so, the early chain is retrieved 422 and if not the process ends 424. Once the critical logs hashes are stored in the blockchain and the corresponding logs are stored in the third party storage entities, there has to be a method to retrieve all the logs back for the purpose of auditing. Every single log hash is added as a transaction on the blockchain and some may need to be retrieved. In a blockchain a single block contains multiple transactions. An interface to the 'dlogging' application may be referred to as 'read'. The input to this interface would include log hashes to retrieve. The 'dlogging' application takes the latest block of the blockchain, also known as 'world state', and starts to iterate over the transactions of that block. Every transaction has the hash of the corresponding log. Now, iterations may occur for as many transactions as number logs requested to obtain the corresponding hashes. If the number of log hashes requested is more than the number of transactions in that particular block, then the 'dlogging' application will fetch the next block and start iterating over those transactions and the process continues. Third party storage may be used to retrieve original logs using the hashes that were just obtained from the blockchain. Any 'content addressable storage' would be acceptable but other alternatives to storage may instead be used.

Figure 5:
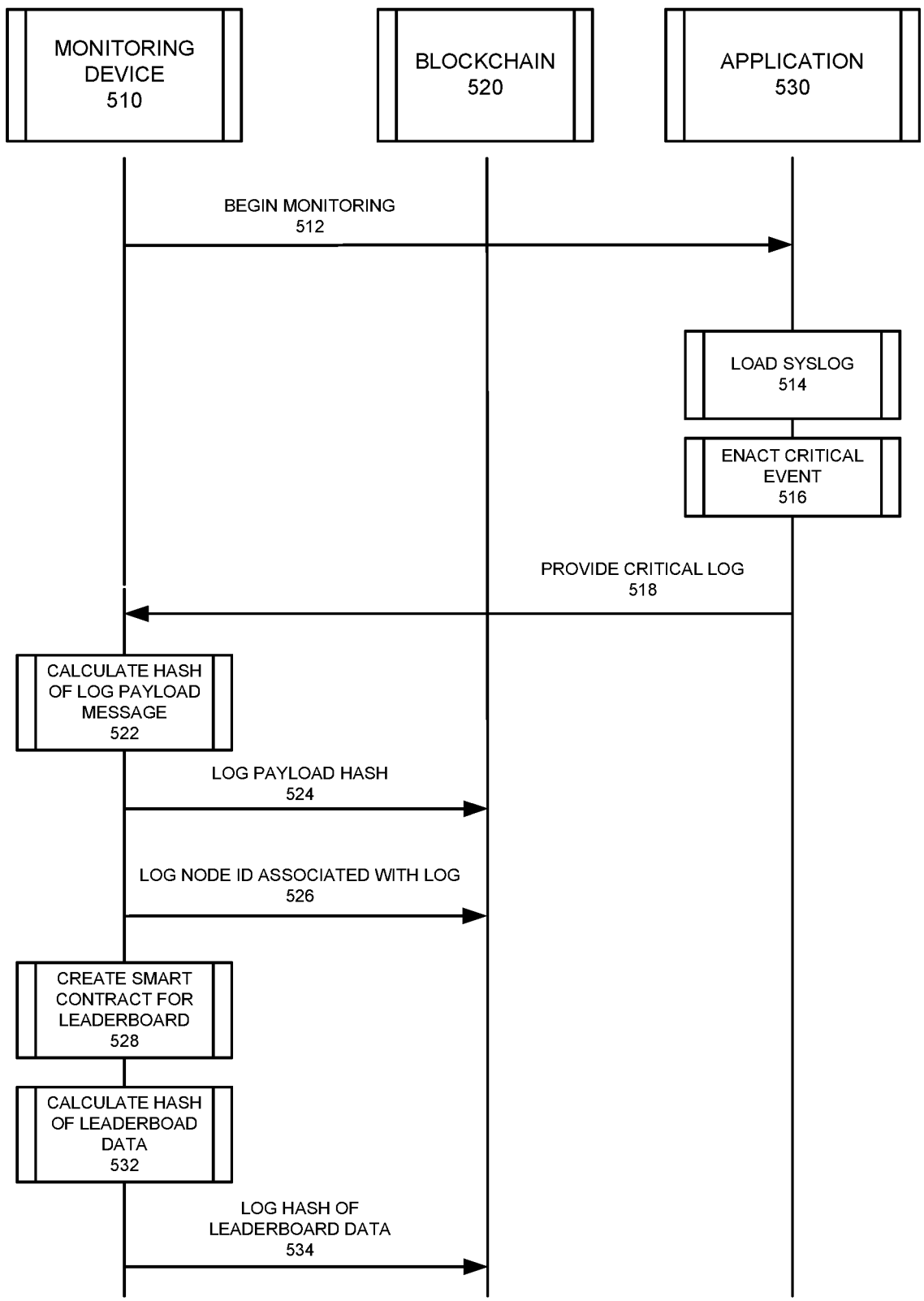
FIG. 5 illustrates a system configuration for monitoring and logging events in the blockchain according to example embodiments.

FIG. 5 illustrates a system configuration 500 for monitoring and logging events in the blockchain according to example embodiments. Referring to FIG. 5, the system may include a monitoring device or audit device 510 which is attempting to identify an application 530 via a monitoring operation 512. The syslog 514 is loaded and any critical events 516 are identified and provided 518 to the monitoring device 510. The hash is calculated for the payload message 522 and logged 524 in the blockchain 520. The log node ID associated with the log 526 is also stored in the blockchain 520. The smart contract is created to identify the leaderboard 528 and the hash of the leaderboard 532 is also logged 534 in the blockchain 520. The original log could be of any arbitrary size, the log is hashed, which identifies the content, and this hash is stored in the blockchain. As for the actual log itself, it is sent to a third party storage, such as a cloud-like destination so that user can retrieve the actual logs later.

Applications may write their critical logs/events in blockchain. The application calls the 'dlogginglog' interface and appends the log message. 'Dlogging' calculates the hash of the log and uploads it to a third party storage. In one example, a transaction is created on the blockchain with the hash of the log as the payload. Since there is a permissioned ledger, the identification is also stored along with the transaction on that blockchain. This helps to identify where the corresponding log originated. A leaderboard may be used, which maintains a list of separate systems or entities sorted by how much logging they each perform. This helps to understand which systems/applications are generating critical logs.

To calculate a leaderboard a smart contract feature of the blockchain may be used. Smart contracts permit blockchain nodes to execute arbitrary code during the transaction. The leaderboard may be stored in a suitable data-structure, such as an interval_tree, which would permit a query over the specified time frame. This provides access to determine which system/application was logging the most over the specific amount of time. Then, the hash of that leaderboard data-structure is calculated and uploaded to a third-party storage and its hash is stored in a blockchain along with the hash of the log. Here, the critical log or 'critical' is user defined and is only for critical logs and not general purpose logging to prevent the blockchain network from being flooded with all information. An application keeps logging various data, but it may decide to log an activity on access server's hosting private emails on a blockchain because that would generate an immutable audit trail. The leaderboard is a board which provides rank to each source based on their logging activity. So if app. A, app. B and app. C log with C being the most logging app. followed by B and then A, the leaderboard will have the order: app. C, app. B, app. A. Leaderboards themselves don't store any logs or hashes of the logs. Leaderboard tells you who is logging the most.

Figure 6A:
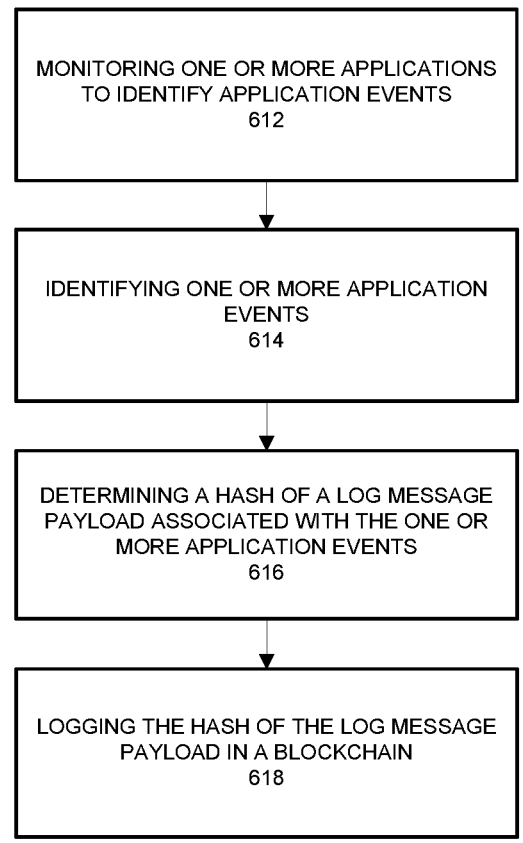
FIG. 6A illustrates a flow diagram of an example method of logging events in a blockchain according to example embodiments.

FIG. 6A illustrates a flow diagram 600 of an example method of logging events in a blockchain according to example embodiments. Referring to FIG. 6A, the method may include monitoring one or more applications to identify application events 612, identifying one or more application events 614, determining a hash of a log message payload associated with the one or more application events 616, and logging the hash of the log message payload in a blockchain 618. The method may also include monitoring the one or more applications by monitoring one or more of a system log and an audit framework. The application events include critical log events. The method may also include uploading the payload to a remote storage location, and registering the hash of the log message payload and a unique identifier of a device associated with the one or more application events in the blockchain. The method may further include creating a smart contract including a leaderboard, determining a hash of leaderboard data associated with the leaderboard, and logging the hash of the leaderboard data in the blockchain. The method may also include receiving a request for shared ledger access from the one or more applications, receiving credentials associated with the one or more applications, issuing an authentication certificate to the application, and receiving the hash of the log message payload in the blockchain responsive to receiving the authentication certificate. Also, the method may further include executing a read function, retrieving a block of the blockchain comprising a world state, and storing output of the block in a local memory.

Figure 6B:
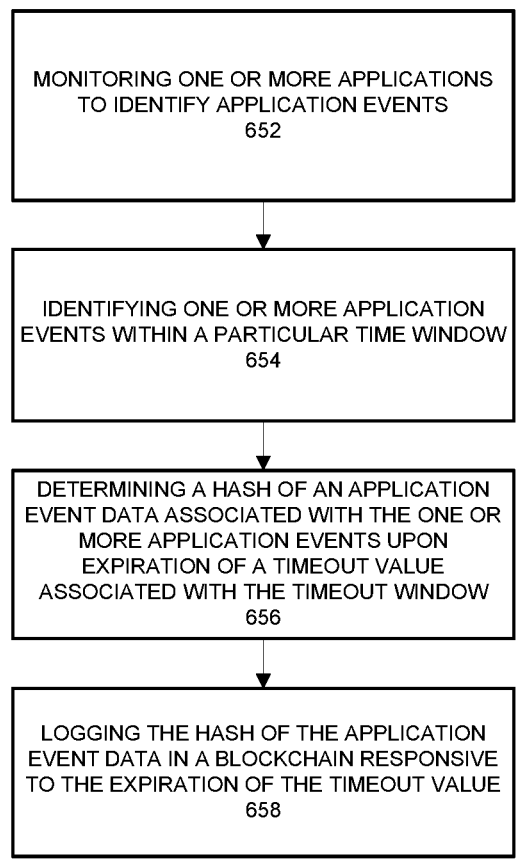
FIG. 6B illustrates a flow diagram of another example method of logging events in a blockchain according to example embodiments.

FIG. 6B illustrates a flow diagram of another example method of logging events in a blockchain according to example embodiments. Referring to FIG. 6B, the method provides monitoring one or more applications to identify application events 652, identifying one or more application events within a particular time window 654, determining a hash of an application event data associated with the one or more application events upon expiration of a timeout value associated with the timeout window 656, and logging the hash of the application event data in a blockchain responsive to the expiration of the timeout value 658. Events may be identified multiple times during a particular time window. In order to maintain integrity and accuracy (i.e., security) of the logged application events, a timeout value may be imposed as a restriction for when an application event must be hashed and logged to correspond to those applications which were active during such time periods. This ensures that the hash log values will be logged at the appropriate times corresponding to the active applications.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example network element 700, which may represent or be integrated in any of the above-described components, etc.

Figure 7:
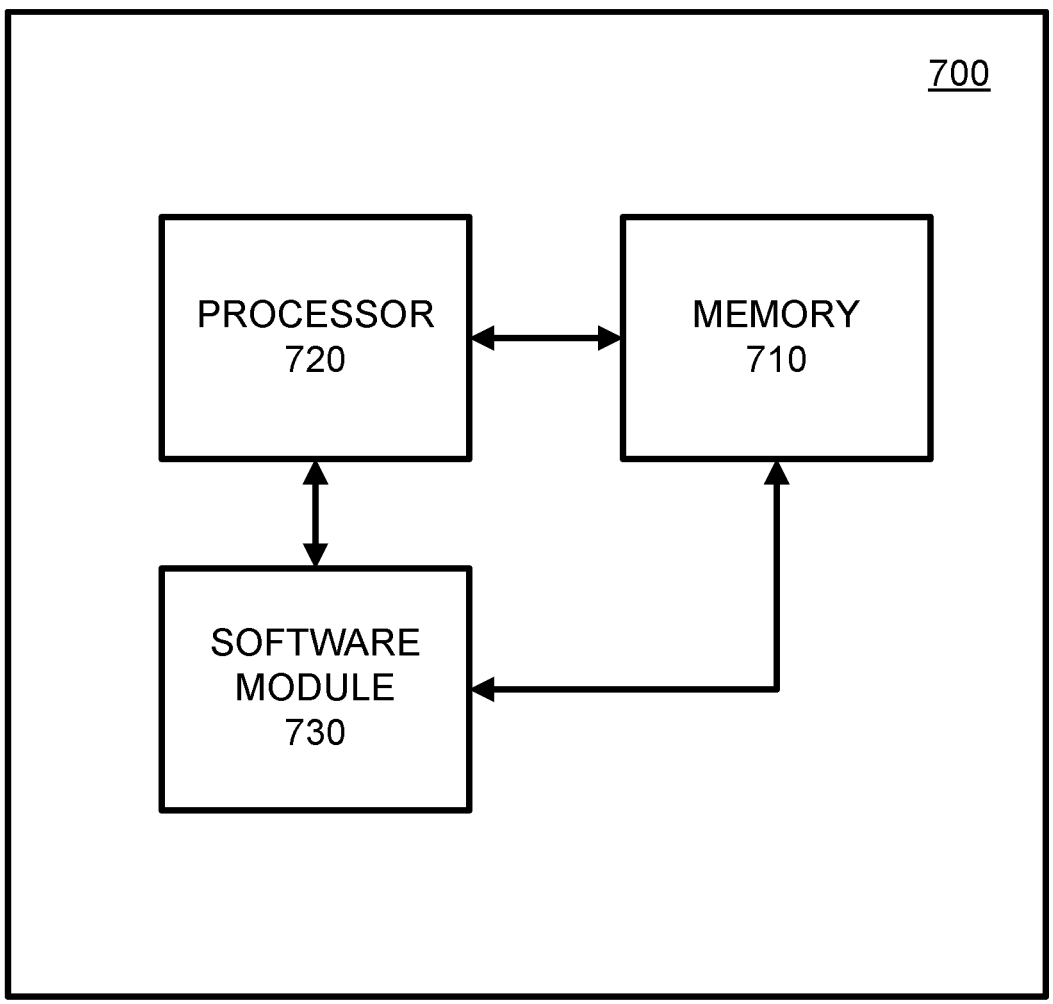
FIG. 7 illustrates an example network entity configured to support one or more of the example embodiments.

As illustrated in FIG. 7, a memory 710 and a processor 720 may be discrete components of a network entity 700 that are used to execute an application or set of operations as described herein. The application may be coded in software in a computer language understood by the processor 720, and stored in a computer readable medium, such as, a memory 710. The computer readable medium may be a non-transitory computer readable medium that includes tangible hardware components, such as memory, that can store software. Furthermore, a software module 730 may be another discrete entity that is part of the network entity 700, and which contains software instructions that may be executed by the processor 720 to effectuate one or more of the functions described herein. In addition to the above noted components of the network entity 700, the network entity 700 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method, comprising:
   identifying, by a user device, one or more application events related to one or more applications, wherein the application events are critical log events;
   logging a hash of a log message payload, associated with the one or more application events, in a blockchain;
   issuing an authentication certificate to the one or more applications;
   receiving the hash of the log message payload in a blockchain responsive to receiving the authentication certificate;
   accessing, by the user device, a block of the blockchain comprising a world state in which the one or more applications occupies a latest block of the blockchain; and
   storing output of the block in a local memory.

2. The method of claim 1, wherein monitoring the one or more applications further comprises monitoring one or more of a system log and an audit framework.

3. The method of claim 1, wherein the application events comprise critical log events.

4. The method of claim 1, further comprising:
   uploading the payload to a remote storage location; and
   registering the hash of the log message payload and a unique identifier of a device associated with the one or more application events in the blockchain.

5. The method of claim 1, further comprising:
   creating a smart contract comprising a leaderboard which maintains a list of separate systems or entities sorted by an amount of logging each separate systems or entities perform;
   determining a hash of leaderboard data associated with the leaderboard; and
   logging the hash of the leaderboard data in the blockchain.

6. The method of claim 5, further comprising:
   receiving a request for the one or more applications by the user device; and
   receiving a request for shared ledger access from the one or more applications.

7. The method of claim 5, further comprising receiving credentials, by the user device, associated with the one or more applications.

8. An apparatus, comprising: a processor circuit configured to:
   identify, by a user device, one or more application events related to one or more applications, wherein the application events are critical log events;
   log a hash of a log message payload, associated with the one or more application events, in a blockchain;
   issue an authentication certificate to the one or more applications;
   receive the hash of the log message payload in a blockchain responsive to receiving the authentication certificate;

access, by the user device, a block of the blockchain comprising a world state in which the one or more applications occupies a latest block of the blockchain; and store output of the block in a local memory.

9. The apparatus of claim 8, wherein to monitor the one or more applications further comprises the processor being configured to monitor one or more of a system log and an audit framework.

10. The apparatus of claim 8, wherein the application events comprise critical log events.

11. The apparatus of claim 8, wherein the processor is further configured to
upload the payload to a remote storage location, and
register the hash of the log message payload and a unique identifier of a device associated with the one or more application events in the blockchain.

12. The apparatus of claim 8, wherein the processor is further configured to
create a smart contract comprising a leaderboard which maintains a list of separate systems or entities sorted by an amount of logging each separate systems or entities perform;
determine a hash of leaderboard data associated with the leaderboard, and
log the hash of the leaderboard data in the blockchain.

13. The apparatus of claim 12, further comprising:
a receiver configured to receive a request for shared ledger access from the one or more applications, and receive credentials associated with the one or more applications, and
wherein the processor is further configured to issue an authentication certificate to the application, and wherein the receiver is further configured to receive the hash of the log message payload in the blockchain responsive to the authentication certificate being received.

14. The apparatus of claim 13, wherein the processor is further configured to execute a read function, retrieve a block of the blockchain comprising a world state, and store output of the block in a local memory.

15. A non-transitory computer readable storage medium configured to store instructions that when executed cause a processor to perform:
identifying, by a user device, one or more application events related to one or more applications, wherein the application events are critical log events;
logging a hash of a log message payload, associated with the one or more application events, in a blockchain;
issuing an authentication certificate to the one or more applications;
receiving the hash of the log message payload in a blockchain responsive to receiving the authentication certificate;
accessing, by the user device, a block of the blockchain comprising a world state in which the one or more applications occupies a latest block of the blockchain; and storing output of the block in a local memory.

16. The non-transitory computer readable storage medium of claim 15, wherein monitoring the one or more applications further comprises monitoring one or more of a system log and an audit framework.

17. The non-transitory computer readable storage medium of claim 15, wherein the application events comprise critical log events.

18. The non-transitory computer readable storage medium of claim 15, wherein the processor is further configured to perform:
uploading the payload to a remote storage location; and
registering the hash of the log message payload and a unique identifier of a device associated with the one or more application events in the blockchain.

19. The non-transitory computer readable storage medium of claim 15, wherein the processor is further configured to perform:
creating a smart contract comprising a leaderboard;
determining a hash of leaderboard data associated with the leaderboard; and
logging the hash of the leaderboard data in the blockchain.

20. The non-transitory computer readable storage medium of claim 19, wherein the processor is further configured to perform:
receiving a request for shared ledger access from the one or more applications;
receiving credentials associated with the one or more applications;
issuing an authentication certificate to the application;
receiving the hash of the log message payload in the blockchain responsive to receiving the authentication certificate;
executing a read function;
retrieving a block of the blockchain comprising a world state; and
storing output of the block in a local memory.

* * * * *